Oct. 3, 1950          J. FRIEDL          2,524,699
FLOAT VALVE
Filed Aug. 16, 1946          2 Sheets-Sheet 1
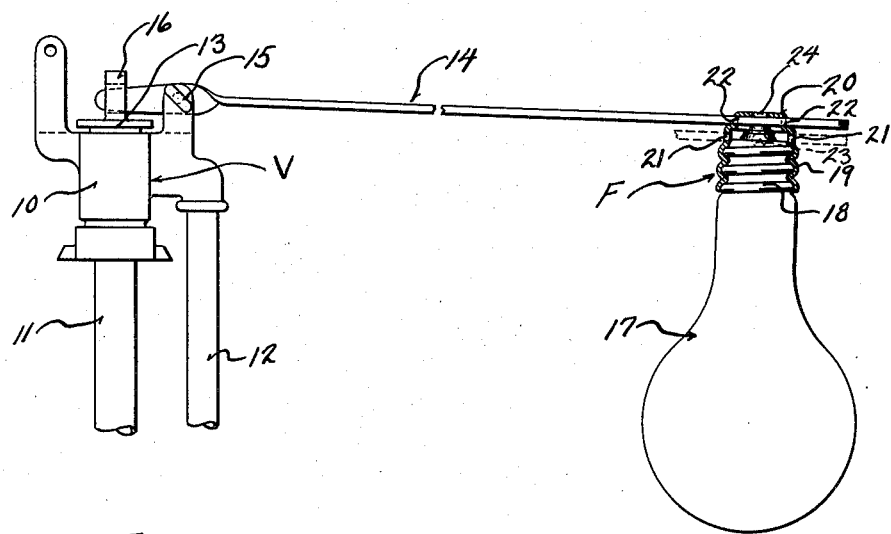
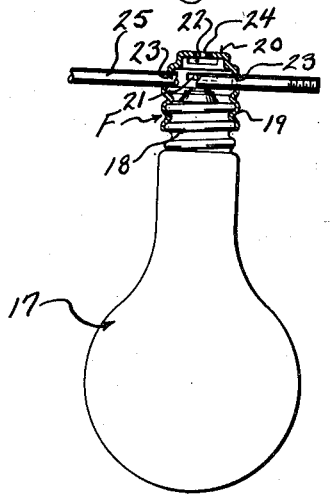
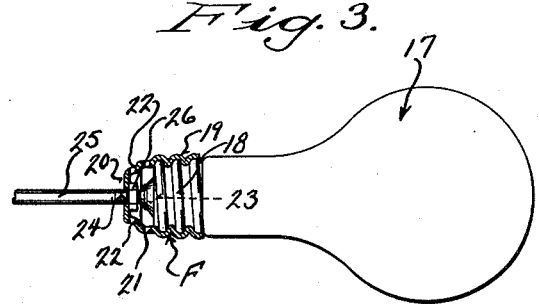
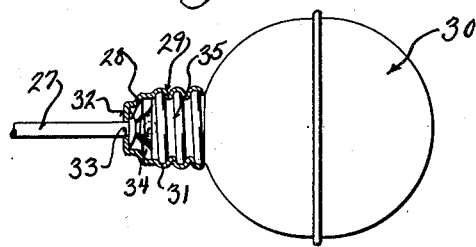
INVENTOR
JOSEPH FRIEDL
BY 
ATTORNEYS Oct. 3, 1950　　　　　J. FRIEDL　　　　2,524,699
FLOAT VALVE
Filed Aug. 16, 1946　　　　　　　　2 Sheets-Sheet 2
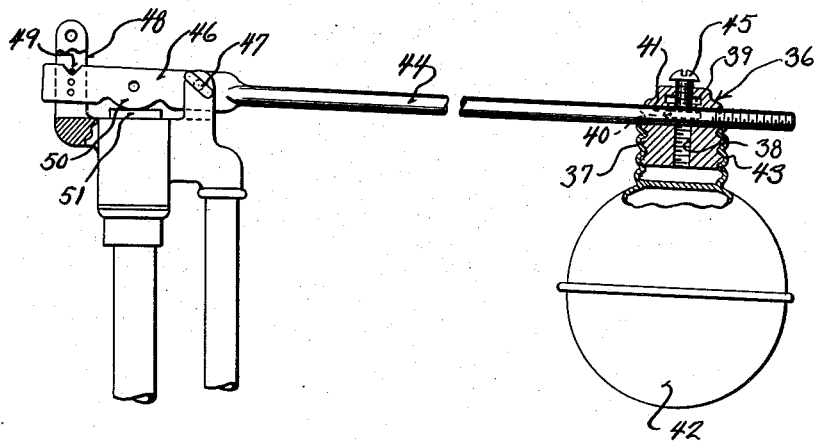
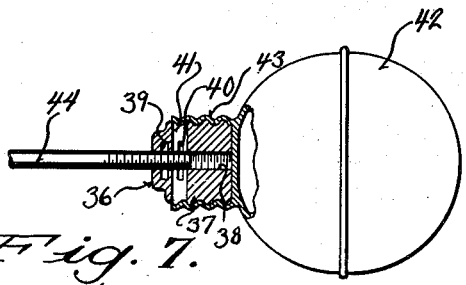
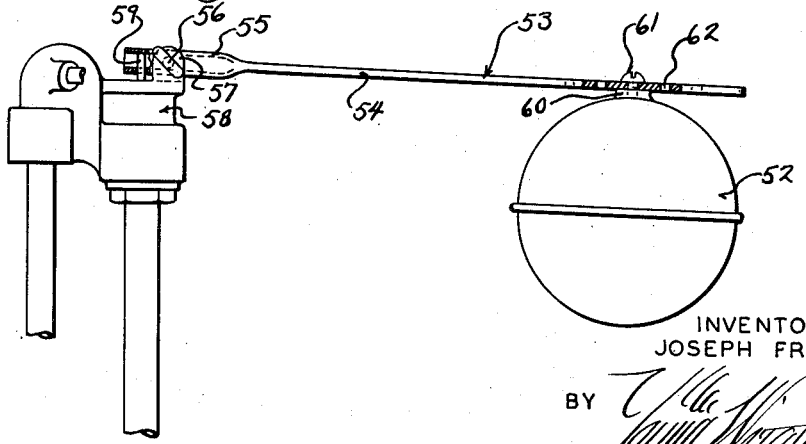
INVENTOR
JOSEPH FRIEDL
BY
ATTORNEYS Patented Oct. 3, 1950

2,524,699

UNITED STATES PATENT OFFICE 2,524,699

FLOAT VALVE

Joseph Friedl, Milwaukee, Wis.

Application August 16, 1946, Serial No. 690,997

2 Claims. (Cl. 137—104)

This invention appertains to flush tanks for water closets and more particularly to a novel float control valve for the water inlet pipe of the flush tank.

One of the primary objects of my invention is to provide a novel type of float and a novel fixture for facilitating the association of the float with different characters of float or valve rods or levers.

Another salient object of my invention is to provide novel means for adjustably securing the fixture in a set selected position on the float rod or lever by the mere threading of the float in the fixture tight against the float rod.

A further important object of my invention is to provide a universal fixture for connecting a float to a float lever, whereby not only can the float be adjustably associated with rods of different cross sectional configuration at different points thereon, but whereby the float can be secured at different angles and different levels on the rod to suit different valve and tank characteristics.

A still further object of my invention is to provide a fixture for attaching floats to float levers of the above character, which will be durable and efficient in use, one that will be simple and easy to manufacture and one which can be placed upon the market at a very low cost.

With these and other objects in view the invention consists in the novel construction, arrangement and formation of parts, as will be hereinafter more specifically described, claimed, and illustrated in the accompanying drawings, in which drawings:

Figure 1 is a side elevational view showing my fixture connected to the float rod of a water inlet valve of a flush tank, the view also showing one particular type of float used, the fixture being shown broken away and in section.

Figure 2 is a fragmentary side elevational view showing the fixture associated with a different type of float rod, the fixture in this view also being shown in cross section.

Figure 3 is a view similar to Figure 2 but showing the fixture applied to the extreme outer end of the float rod.

Figure 4 is a fragmentary detail side elevational view showing a modified form of fixture and float, the fixture being applied to the extreme outer end of a float rod.

Figure 5 is a view similar to Figure 1 but showing a further modified form of fixture and float, the fixture and float being shown with an inlet valve of a different type than that shown in Figure 1.

Figure 6 is a fragmentary detail side elevational view showing the fixture and float of the type illustrated in Figure 5 applied to the extreme outer end of a float rod.

Figure 7 is a view similar to Figure 5 but showing a different type of inlet valve and a different means for securing a ball float directly to a flat float rod.

Referring to the drawings in detail, wherein similar reference characters designate corresponding parts throughout the several views, the letter F generally indicates my novel fixture for association with an inlet valve V of a flush tank (not shown). The valve V will not be described in detail, but the same includes a valve casing 10 secured to the upper end of an inlet pipe 11. Controlling the flow of water through the casing 10 from the pipe 11 to an outlet pipe 12 is a slide valve 13. Rockably mounted on the valve casing 10 is the float lever 14. The float lever 14 in the present instance, is made from a flat sheet of metal and the inner end of the strip is twisted at right angles to the body portion thereof. This twisted portion is rockably mounted on a pivot 15 and is inserted in an eye or loop 16 formed on or carried by the slide valve.

The fixture F is utilized for detachably and adjustably connecting a float 17 with the float rod 14. The float 17 can be a burnt out incandescent light bulb, and this bulb is of the type having a sealed glass body and a threaded shank or shell 18.

The fixture F can be made from any desired material and includes a substantially cylindrical side wall 19 and an outer end wall 20. The side wall 19 is internally threaded to receive the shank 18 of the bulb 17. The side wall is provided adjacent to the wall 20 with diametrically aligned slots 21 and the top wall 20 has punched out therein similar aligned slots 22. The wall 19 has also formed therein diametrically aligned round openings 23 and the openings 23 are arranged at right angles to the slots 21. The axial center of the top wall 20 is provided with an opening 24. The purpose of the openings and slots 21, 22, 23 and 24 will now be described.

In use of my fixture, the slots or openings are selected in the fixture which will accommodate the float rod and as illustrated in Figure 1 the float rod being of a flat shape is inserted either in the slots 21 or the slots 22. In the present instance the rod 14 is placed in the slots 22 so that the fixture can extend a desired distance below the float rod, obviously, if it was desired to have the fixture in a slightly raised position the rod can be inserted in the openings 21.

The fixture can be slid back and forth on the float rod to the best and desired point, after which the shank 18 of the bulb is threaded into the fixture so that the same will bear tightly against the rod. This will clamp the fixture and the float on the rod.

Where round float rods are used, the rod indicated by the reference character 25 (see Figs. 2 and 3) can be inserted in the round openings 23. In this instance the fixture can be slid on the rod to the desired place after which the bulb can be threaded into the fixture tight against said rod. If desired the round rod can be inserted in the opening 24 in the end wall 20 so that the fixture and float will extend straight out parallel with the rod. Where the rod is inserted in the opening 24 a nut 26 is threaded on the end of the rod against the inner face of the end wall 20 and the shank of the float can be threaded against the nut so as to prevent the same from coming off the rod.

In Figure 4 I have shown a float rod 27 having an upset head 28 and a fixture 29 for a float 30. The fixture 29 is similar to the fixture shown in Figures 1, 2, and 3 and hence is provided with an internally threaded side wall 31 and an end wall 32. The end wall 32 is provided with an axial opening 33 and the side wall 29 can be provided with diametrically aligned round openings 34. Hence the rod 27 can either be inserted through the opening 33 or the openings 34. In this type of rod the end thereof remote from the head 32 is first inserted through the opening 33 until the head engages the inner surface of the wall 32 after which the float 30 can be associated with the fixture. The float 30 has been shown to be of the round type usually formed from metal and this float is provided with a threaded shank 35. The shank is threaded into the fixture 29 tight against the head 32 so as to prevent longitudinal shifting movement of the fixture on the rod.

In Figures 1 to 4 inclusive I have shown the float provided with a male shank and the fixture with a female socket. This can be reversed and the float can be provided with a socket and the fixture with a shank for reception in the socket. In Figures 5 and 6 I have shown this form of the invention. The fixture is generally indicated by the reference character 36 and the fixture is in the nature of a solid plug. The plug is externally threaded as at 37 and is provided with an axially disposed internally threaded bore 38. At spaced points the plug can be provided with diametrically extending slots 39 and 40 and these slots can be of different heights to receive flat rods of different thicknesses. The plug is further provided with a diametrically extending round opening 41 and this opening 41 is arranged at right angles to the slots 39 and 40.

This type of fixture can be used with a ball float 42 and the ball float is provided with an outwardly extending internally threaded sleeve or socket 43 for receiving the plug fixture.

In use of this type of fixture for round rods, the rod is inserted in the opening 41 where it is desired to have the float extend at right angles to the float rod (see Fig. 5). After the fixture is placed on the rod indicated by the reference character 44 in Figures 4 and 5, the float is threaded on the plug fixture against the rod and this will hold the fixture and rod in place. If preferred a set screw 45 can be threaded into the axle bore 38 against the rod to further hold the fixture in a set position. Where it is desired to have the float extend outwardly from the rod the rod can be inserted and threaded into the bore 38 as shown in Figure 6.

Attention is also called to the fact that in Figure 5 the rod 44 is provided with a flat inner end 46, which is rockably mounted on a pin 47 carried by the inlet valve casing. The extreme inner end of the rod is notched and is received in a yoke 48 on the inlet valve casing and this end of the rod bears against a stop pin 49. The intermediate portion of the flat part of the rod is provided with a nose 50 for engaging against the valve 51 of said inlet valve mechanism.

In Figure 7 I have illustrated a further method of attaching a ball float 52 to a float lever 53. In this form of the invention I have shown the float lever as including a long flat body portion 54 and a cylindrical short portion 55, the short portion, at a point intermediate its ends, is rockably mounted upon a pivot pin 56 carried by a bracket 57. The bracket 57 is formed on the casing of an inlet valve mechanism 58. The valve body of the mechanism is provided with an extending stem 59 which is received in an opening in the extreme inner end of the float lever. Obviously as the float lever or rod 53 swings up and down the valve body will be permitted to rise and fall. The float 52 is provided with an internally threaded neck 60, and this neck receives a set screw 61. The set screw can be placed through any selected opening of a row of openings 62 formed in the outer end of the float lever or rod. Obviously, by inserting the screw 61 through a selected opening 62 and into the neck 60, the float 52 will be firmly clamped to the float rod or lever.

From the foregoing description, it can be seen that I have provided an exceptionally simple and durable form of device for connecting floats in different selected positions on various types of float levers or rods.

Changes in details may be made without departing from the spirit or scope of my invention but what I claim as new is:

1. A fixture for detachably connecting a float of the type having a threaded connecting portion with a float rod comprising a unitary body having openings for receiving the float rod and a threaded portion for adjustably receiving the threaded connecting portion of the float, so that said threaded connecting portion of the float can bear against the rod to hold said float in a fixed position thereon.

2. A fixutre for detachably connecting a float of the type having a threaded connecting shank with a float rod comprising a hollow shell including a substantially cylindrical side wall and an outer wall, said side wall having aligned openings for slidably receiving a float rod and said side wall being also internally threaded for adjustably receiving the threaded shank of a float, so that upon the threading of the shank in the shell said shank will bear against the portion of the rod inserted in said slots for holding the float and fixture in an adjusted position on the rod.

JOSEPH FRIEDL.

REFERENCES CITED

The following references are of record in the file of this patent:

UNITED STATES PATENTS

| Number | Name | Date |
| --- | --- | --- |
| 459,044 | Moore | Sept. 8, 1891 |
| 588,461 | Moore | Aug. 17, 1897 |
| 984,117 | Vogelback | Feb. 14, 1911 |
| 1,690,057 | Coleman | Oct. 30, 1928 |
| 1,980,430 | Pearse | Nov. 13, 1934 |
| 1,982,167 | Kauchack | Nov. 27, 1934 |
| 1,982,550 | Skuttle | Nov. 27, 1934 |
| 2,016,183 | Stefancin | Oct. 1, 1935 |
| 2,342,487 | Posada | Feb. 22, 1944 |

FOREIGN PATENTS

| Number | Country | Date |
| --- | --- | --- |
| 543,038 | Great Britain | of 1942 |
| 543,558 | Great Britain | of 1942 |
| 662,785 | Germany | July 21, 1938 |